United States Patent
Morman et al.

(10) Patent No.: US 9,156,310 B2
(45) Date of Patent: Oct. 13, 2015

(54) CONTROLLED LUBRICANT VOLUME SEAL HOUSING

(71) Applicants: Todd R. Morman, Pottsboro, TX (US); Stephen Tressel, Pembroke, MA (US); Matthew Douville, Worcester, MA (US)

(72) Inventors: Todd R. Morman, Pottsboro, TX (US); Stephen Tressel, Pembroke, MA (US); Matthew Douville, Worcester, MA (US)

(73) Assignee: SIEMENS INDUSTRY, INC, Alpharetta, GA (US)

(*) Notice: Subject to any disclaimer, the term of this patent is extended or adjusted under 35 U.S.C. 154(b) by 283 days.

(21) Appl. No.: 13/739,046

(22) Filed: Jan. 11, 2013

(65) Prior Publication Data

US 2014/0197679 A1 Jul. 17, 2014

(51) Int. Cl.
| F16J 15/34 | (2006.01) |
| B60B 27/00 | (2006.01) |
| B60B 37/04 | (2006.01) |
| F16C 33/76 | (2006.01) |
| F16C 33/78 | (2006.01) |
| F16C 19/36 | (2006.01) |

(52) U.S. Cl.
CPC ............ *B60B 27/0073* (2013.01); *B60B 37/04* (2013.01); *F16C 33/768* (2013.01); *F16C 33/783* (2013.01); *F16C 33/7826* (2013.01); *F16C 33/7889* (2013.01); *F16C 19/361* (2013.01)

(58) Field of Classification Search
CPC ....... F16J 15/35; F16J 15/344; F16J 15/4472; F16J 15/54
USPC ......... 277/371, 377, 382, 384, 380, 423, 429; 384/481
See application file for complete search history.

(56) References Cited

U.S. PATENT DOCUMENTS

| 2,377,452 A * | 6/1945 | Reynolds ................. 277/371 |
| 2,561,694 A * | 7/1951 | Gilbert, Sr. ............... 277/366 |
| 3,692,317 A * | 9/1972 | Augustin ................. 277/382 |
| 4,018,305 A * | 4/1977 | Tietje .................... 184/45.1 |
| 4,418,919 A * | 12/1983 | Wentworth ............... 277/371 |
| 4,605,234 A * | 8/1986 | Metcalf .................. 277/377 |
| 4,799,808 A * | 1/1989 | Otto ...................... 277/349 |
| 4,856,794 A * | 8/1989 | Boyers et al. ............ 277/571 |
| 6,041,903 A * | 3/2000 | Burns et al. ............ 192/85.02 |
| 6,334,619 B1 * | 1/2002 | Dietle et al. ............ 277/559 |
| 6,671,125 B1 * | 12/2003 | Sumi .................... 360/99.08 |
| 7,681,889 B2 * | 3/2010 | Tsuboi et al. ........... 277/377 |
| 7,837,199 B2 * | 11/2010 | Craig et al. ............ 277/377 |
| 7,883,093 B2 * | 2/2011 | Ueda et al. ............. 277/371 |

(Continued)

OTHER PUBLICATIONS

Radial Shaft Seal; Wikipedia Webpage, downloaded from http://en.wikipedia.org/wiki/Radial_shaft_seal on Oct. 19, 2012 (2 pages).

(Continued)

*Primary Examiner* — Vishal Patel
*Assistant Examiner* — L. Susmitha Koneru

(57) ABSTRACT

A mechanical drive seal housing includes a lubricant reservoir to supplement the amount of available lubricant. The lubricant is used to cool a seal having two halves. The seal halves include complimentary textures configured to move and retain lubricant. A drive axle includes a stationary shaft and a wheel hub rotatably connected to the stationary shaft. A metal face seal is located at an interface between the stationary shaft and the wheel hub. A stationary seal half of the metal face seal is located in a mechanical drive seal housing which includes a lubricant reservoir to supplement the amount of available lubricant.

20 Claims, 7 Drawing Sheets

(56) References Cited

U.S. PATENT DOCUMENTS

| | | | |
|---|---|---|---|
| 2002/0007997 A1* | 1/2002 | Kundermann et al. | 192/48.8 |
| 2002/0063392 A1* | 5/2002 | Fedorovich | 277/371 |
| 2004/0256808 A1* | 12/2004 | Tsuboi et al. | 277/377 |
| 2006/0045405 A1* | 3/2006 | Pettersson et al. | 384/624 |
| 2008/0127836 A1* | 6/2008 | Bokelmann et al. | 99/456 |
| 2013/0223782 A1* | 8/2013 | Mandou | 384/481 |
| 2014/0167359 A1* | 6/2014 | Dudek | 277/306 |
| 2014/0197675 A1* | 7/2014 | Morman et al. | 301/105.1 |

OTHER PUBLICATIONS

End Face Mechanical Seal; Wikipedia Webpage, downloaded from http://en.wikipedia.org/wiki/Rotating_face_mechanical_seal on Oct. 19, 2012 (5 pages).

* cited by examiner

CONTROLLED LUBRICANT VOLUME SEAL HOUSING

BACKGROUND

The present disclosure relates generally to lubrication systems, and more particularly to seal housings.

Many mechanical devices require lubrication systems to promote longevity of moving parts by reducing friction between parts moving relative to one another. Lubrication systems typically require seals to prevent or minimize leakage of lubricant and prevent intrusion of foreign material such as abrasives.

Mechanical drives on off-highway equipment such as dump trucks, backhoes, front end loaders, etc. are subject to abrasive media such as sand, mud, dust, etc. A metal face seal is typically used to dynamically seal mechanical drives whose undercarriages are exposed to adverse environmental conditions which occur during off-highway vehicle operations.

Some mechanical drives have high peripheral seal speeds due to the large diameter of the seals which can be greater than 500 mm. When the size of the equipment becomes very large, the peripheral speed of the rotating seal half increases and heat generation due to the high peripheral speed becomes a threat to the life of a polymer component of the seal.

In addition, for the seal to be cooled properly, it needs a constant supply of lubricant. In certain situations, the amount of lubricant supplied to a seal in mechanical drive is less than desired for optimal seal performance due to various design constraints. Also, when the seal spins, lubricant on the seal can be slung off of the seal. The lubricant slung out to the sides of the housing does not aid in cooling the seal. At high speeds, most of the lubricant is slung to the sides of the housing and very little lubricant is left on the seal.

The high peripheral seal speeds and less than desired amount of lubricant typically result in the generation of heat from friction as the seal moves relative to a sealing surface. The heat generated can be sufficiently high to shorten the life of the seal.

SUMMARY

In one embodiment, a mechanical drive seal housing includes a circular outer diameter and a circular inner diameter. A seal receiving slot is located on a first side of the mechanical drive seal housing between the outer diameter and the inner diameter. A lubricant reservoir is located adjacent to the seal receiving slot and between the outer diameter and the inner diameter. In one embodiment, the lubricant reservoir protrudes outward from a second side of the mechanical drive seal housing in order to increase the surface area and volume of the lubricant. The lubricant reservoir is sized to contain a predetermined amount of lubricant, which, in one embodiment, is substantially the same amount of lubricant a mechanical drive seal housing without a lubricant reservoir can hold. In one embodiment, the lubricant reservoir is located radially and axially inward of the seal receiving slot. In one embodiment, the lubricant reservoir protrudes along substantially one-half the circumference of the mechanical drive seal housing.

In one embodiment, a drive axle includes a spindle, a wheel hub rotatably connected to the spindle, and a mechanical drive seal housing connected to the spindle between the spindle and the wheel hub. The mechanical drive seal housing includes a circular outer diameter and a circular inner diameter. A seal receiving slot is located on a first side of the mechanical drive seal housing between the outer diameter and the inner diameter. A lubricant reservoir is located adjacent to the seal receiving slot and between the outer diameter and the inner diameter. In one embodiment, the mechanical drive seal housing includes a shelf located opposite a radially inward facing surface of the seal receiving slot to produce a cavity having a predetermined volume.

These and other advantages of the invention will be apparent to those of ordinary skill in the art by reference to the following detailed description and the accompanying drawings.

DETAILED DESCRIPTION

In one embodiment, a seal housing is configured to increase the volume of lubricant located in the bottom of a cavity surrounding a seal and decreases the volume of air space in which the lubricant is able to be slung into when in operation. As described in further detail below, lubricant in the seal housing is carried upward by a rotating seal half and flows to an area of greatest inner diameter of the seal housing and is held via centrifugal forces during rotational operation. Some volume of lubricant flows through a bearing and is temporarily unavailable to cool the seal. When rotational operation ends, the lubricant returns via gravity to the bottom of the cavity surrounding the seal.

Figure 1:
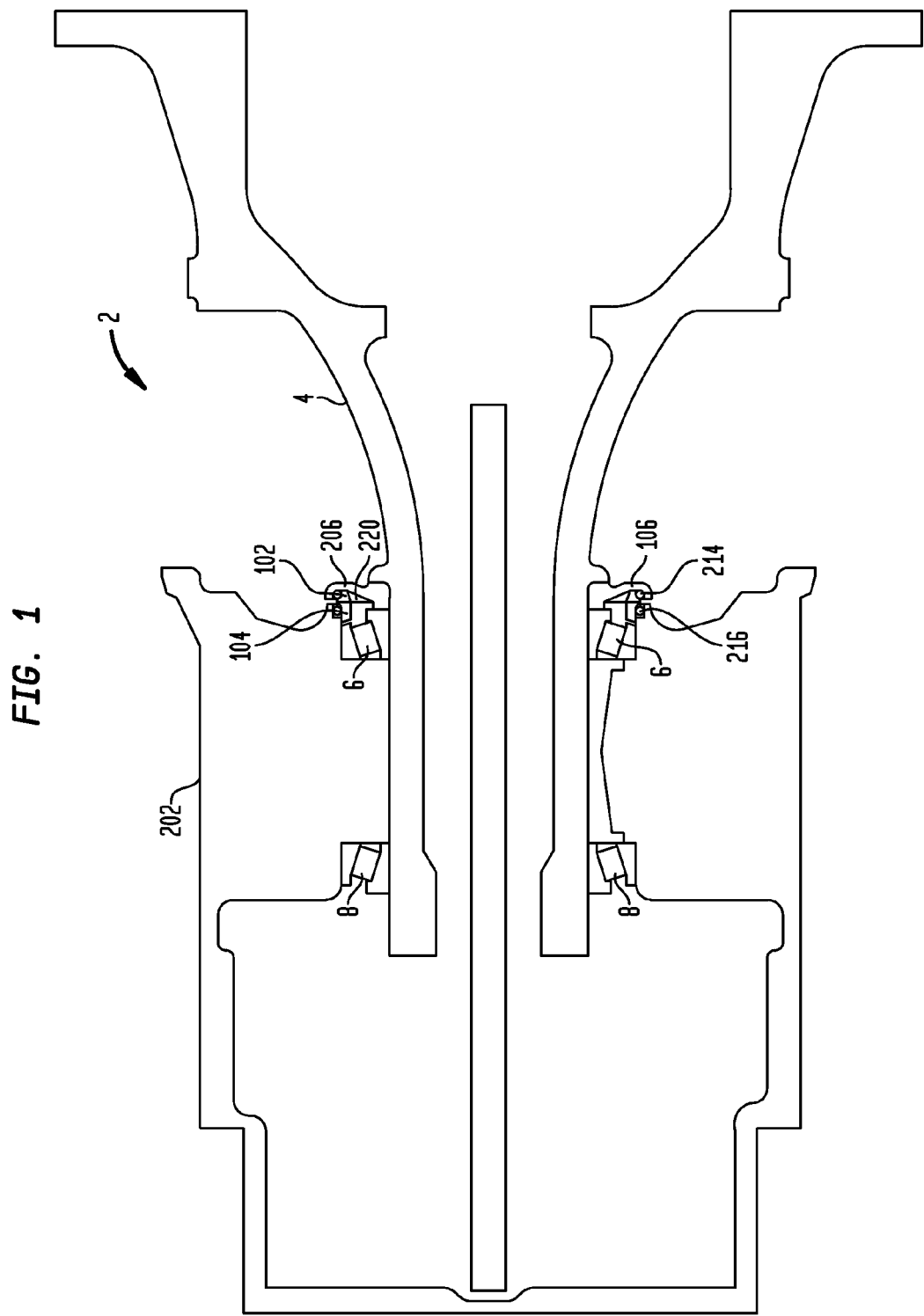
FIG. 1 shows one half of a drive axle for an off-highway vehicle.

FIG. 1 depicts one half of a drive axle 2 for an off-highway vehicle having a standard seal housing 206. Spindle 4 supports seal housing 206 and tapered roller bearings 6, 8. Tapered roller bearings 6, 8 rotatably connect rotating wheel hub 202 to spindle 4. In operation, a rim and wheel assembly (not shown) are mounted to wheel hub 202 which rotates about a longitudinal axis of spindle 4 via roller bearings 6, 8. Self-cooling metal face seal 102 is located at the interface between spindle 4 and wheel hub 202. Rotating seal half 104 is shown having a substantially L-shaped cross section and is frictionally held in a substantially circular opening of rotating wheel hub 202 via O-ring 216. Stationary seal half 106 has an L-shaped cross section which is a mirror image of the L-shaped cross section of rotating seal half 104. Stationary seal half 106 is frictionally held in seal receiving slot of standard seal housing 206 via O-ring 214. Upper cavity 220 is bounded by tapered roller bearing 6, seal housing 206 and seal 102. Upper cavity 220 provides an air space in which lubricant is slung during operation of drive axle 2. In operation, stationary seal half 106, O-ring 214, and standard seal housing 206 remain stationary while rotating seal half 104, O-ring 216 and rotating wheel hub 202 rotate around a longitudinal axis of rotating seal half 104. In one embodiment, in addition to retaining seal halves 104, 106 in place, O-rings 214, 216 also urge seal halves 104, 106 into contact with one another as shown in FIG. 1. More specifically, O-rings 214, 216 urge the short lengths of the L-shaped cross sections of each of seal halves 104, 106 toward one another. O-rings 214, 216 are made of a compressible material such as rubber but may be made of other material such as polymer to withstand higher temperatures. In one embodiment, seal 102 comprises two seal halves having complimentary textures for distributing lubricant from a lubricant reservoir in a lubrication sump to seal faces of the two halves in order to lubricate and cool the seal. Complimentary textures are textures which work together to move lubricant from one are or location to another area or location. Rotating seal half 104 comprises a texture for lifting lubricant from the lubricant reservoir and the stationary seal half 106 comprises a texture for receiving lubricant from the rotating seal half. It should be noted that standard seal housing 206 as shown in FIG. 1 does not include a lubricant reservoir.

Figure 2:
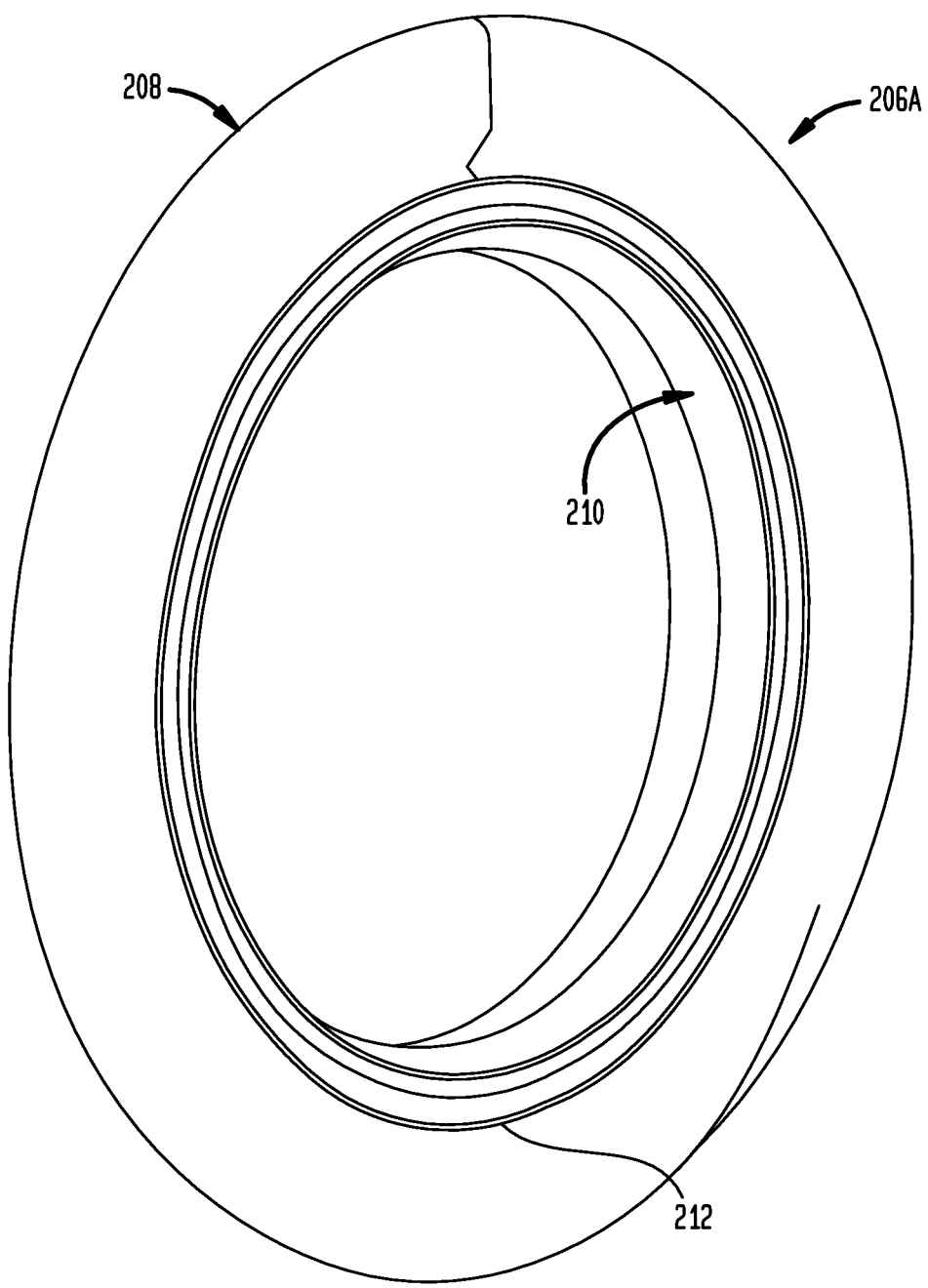
FIG. 2 shows one side of a seal housing according to one embodiment.

FIG. 2 depicts a first side of a modified seal housing according to an embodiment of the present invention. As illustrated in FIG. 2, modified seal housing 206A having outer diameter 208 and inner diameter 210. Modified seal housing 206A comprises lubricant reservoir 212 protruding outward parallel to the longitudinal axis of the modified seal housing 206A. Lubricant reservoir 212, in one embodiment, is tapered so that the maximum protrusion is located at a point on modified seal housing 206A that will be the lowest point of modified seal housing 206A when installed in drive axle 2 (shown in FIG. 1). As such, lubricant travels back to lubricant reservoir 212 via gravity. Lubricant reservoir 212, in one embodiment, protrudes along the circumference of modified seal housing 206A generally below a standing lubricant level (described in detail below). More specifically, lubricant reservoir 212, in one embodiment, tapers from zero protrusion to maximum protrusion to zero protrusion along half of the circumference of modified seal housing 206A (see also FIG. 5 described in detail below). Lubricant reservoir 212, in other embodiments, can protrude along approximately one-third to one-half of the circumference of modified seal housing 206A.

Figure 3:
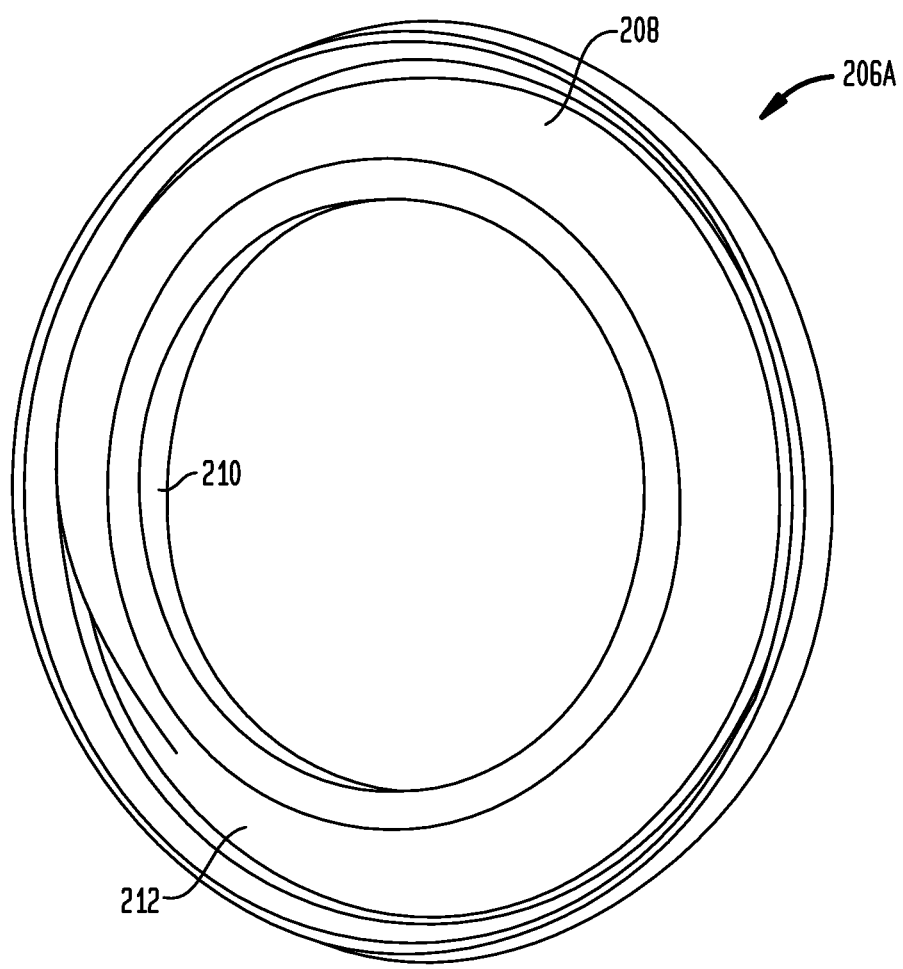
FIG. 3 shows an opposite side of the seal housing shown in FIG. 2.

FIG. 3 depicts a second side of modified seal housing 206A in which open cavity 218 is formed within lubricant reservoir 212 is shown.

Figure 4:
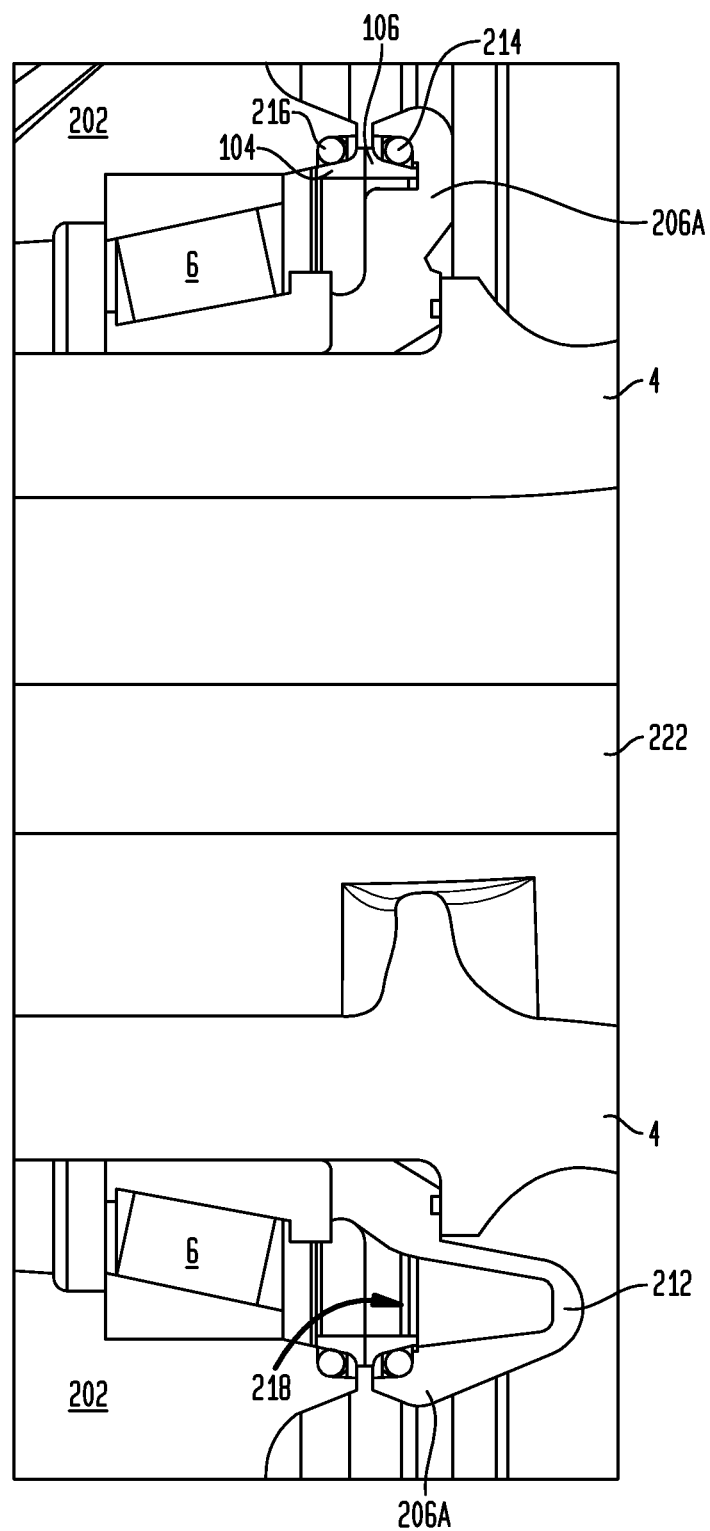
FIG. 4 shows a cutaway of a portion of a drive axle according to one embodiment.

FIG. 4 depicts modified seal housing 206A installed in drive axle 2 shown in FIG. 1. Modified seal housing 206A is mounted to spindle 4 and has a slot for retaining stationary seal half 106 via O-ring 214. Rotating seal half 104 is retained in a slot in wheel hub 202 via O-ring 216. Wheel hub 202, rotating seal half 104, and O-ring 216 rotate about a longitudinal axis of spindle 4 via tapered roller bearings 6.

As shown in the lower half of FIG. 4, modified seal housing 206A comprises lubricant reservoir 212 which is shown in FIG. 4 protruding from a lower section of modified seal housing 206A. Lubricant reservoir 212, in one embodiment, includes open cavity 218 sized to contain an amount of additional lubricant equal to an amount of lubricant a similar drive axle (such as drive axle 2 shown in FIG. 1) without modified seal housing 206A would typically contain. Therefore, in one embodiment, lubricant reservoir 212 doubles the lubricant capacity of a drive axle. In other embodiments, lubricant reservoir can be sized to contain other amounts of additional lubricant. In one embodiment, the additional volume of lubricant acts as a larger thermal mass as compared to the lesser volume of lubricant contained using a standard seal housing (e.g., standard seal housing 206 shown in FIG. 2). The larger thermal mass aids in keeping seal 102 cool and extending seal life.

Figure 5:
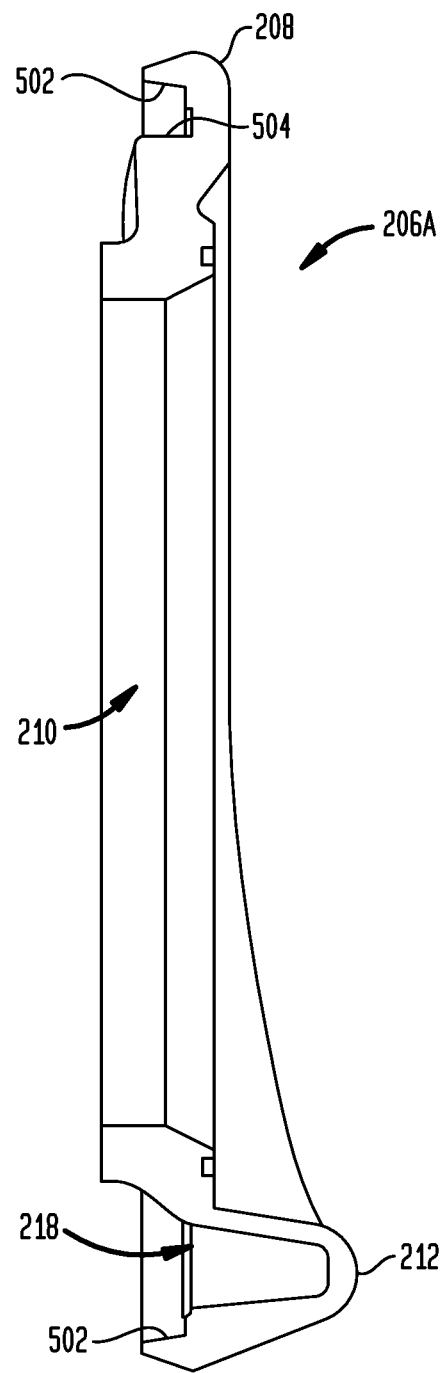
FIG. 5 shows a cutaway of the seal housing shown in FIGS. 2 and 3.

FIG. 5 depicts a cross section of modified seal housing 206A. As shown in FIG. 5, modified seal housing 206A has seal retaining surface 502 located between inner diameter 210 and outer diameter 208. Modified seal housing 206A has lubricant reservoir 212 located between inner diameter 210 and outer diameter 208 and also radially inward of seal retaining surface 502. Lubricant reservoir 212 protrudes outward parallel to a longitudinal axis of modified seal housing 206A. The upper portion of FIG. 5 depicts how modified seal housing 206A is modified in one embodiment as compared to standard seal housing 206. Modified seal housing 206A is designed to have a shelf opposite seal retaining surface 502 along the circumference of modified seal housing outside of lubricant reservoir 212. Shelf 504, in one embodiment, is located a specific distance from seal retaining surface 502 to produce a cavity having a specific volume. In one embodiment, the cavity is sized to prevent excess oil from being slung into the airspace located between seal 102 and shelf 504.

Returning to FIG. 1, in operation with standard seal housing 206, wheel hub 202, rotating seal half 104 and O-ring 216 rotate about spindle 4. As rotating seal half 104 rotates, it travels through a lubricant. The texture of rotating seal half 104 causes lubricant to be lifted and moved toward stationary seal half 106 in order to cool seal 102. As lubricant is lifted and slung around the interior of wheel hub 202 and the area surrounding spindle 4, the amount of remaining lubricant for cooling the seal is less. Less lubricant available for cooling can result in excessive seal 102 temperature since there is insufficient lubricant to distribute to seal 102.

Figure 6A:
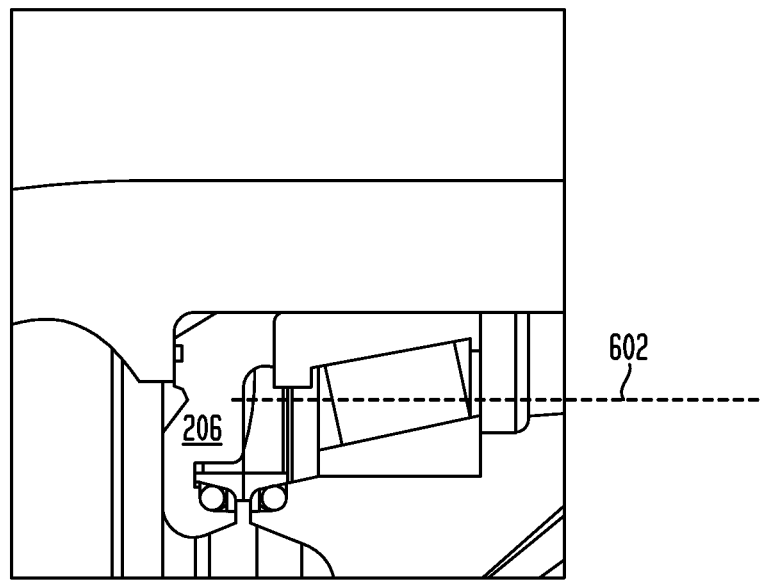
FIG. 6A depicts a standing lubricant level for a standard seal housing.
Figure 6B:
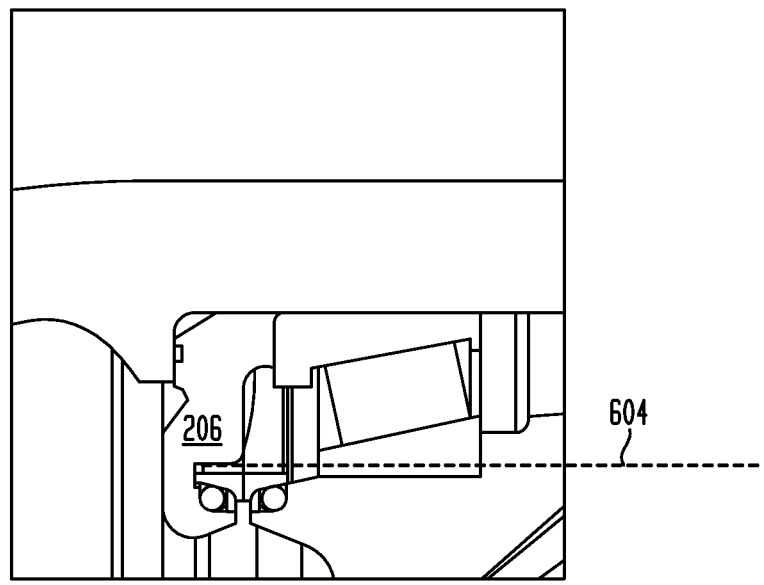
FIG. 6B depicts an operating lubricant level for a standard seal housing.

FIG. 6A depicts standing lubricant level 602 (i.e., the lubricant level when wheel hub 202 and other rotatable components are stationary and lubricant has settled) for a standard seal housing 206. FIG. 6B depicts operating lubricant level 604 (i.e., the lubricant level when wheel hub 202 and other rotatable components are rotating and lubricant has been slung to various surfaces). Operating lubricant level 604 results in a volume of lubricant insufficient to cool seal 102. This insufficient cooling results in decreased life of seal 102.

Figure 7A:
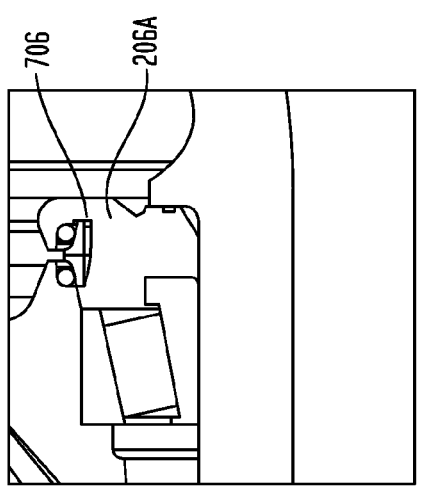
FIGS. 7A and 7B depict a standing lubricant level for a modified seal housing.
Figure 7C:
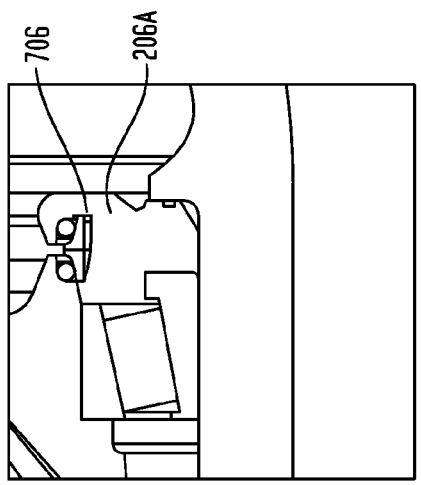
FIGS. 7C and 7D depict an operating lubricant level for a modified seal housing.
Figure 7B:
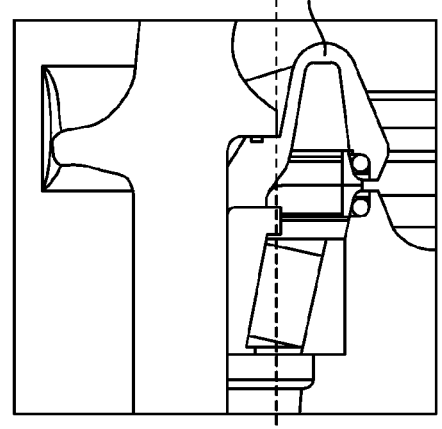
Figure 7D:
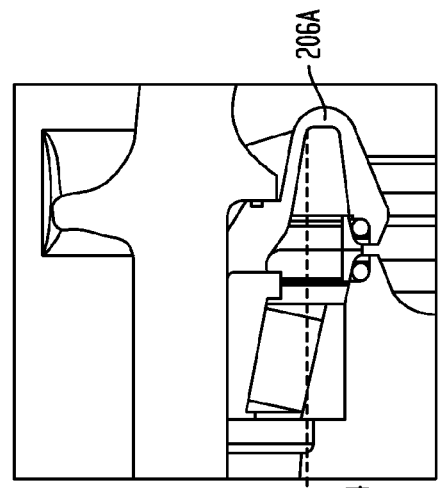

FIGS. 7A and 7B depict modified seal housing 206A and standing lubricant level 702. It should be noted that cavity 706 shown in FIG. 7A contains little or no lubricant when wheel hub 202 and other rotatable components are stationary since the lubricant has settled. FIGS. 7C and 7D depict modified seal housing 206A and operating lubricant level 704. As shown in FIG. 7D, delta H is the differential between standing lubricant level 702 and operating lubricant level 704. Since the surface area of the lubricant in modified seal housing 206A is greater, the drop in standing lubricant level 702 is less and rotating seal half 104 is continuously replenished with lubricant. It should be noted that the differential between standing lubricant level 702 and operating lubricant level 704 as shown in FIGS. 7A-7D is less than the differential between standing lubricant level 602 and operating lubricant level 604 as shown in FIGS. 6A and 6B. This is due in part to the additional volume of lubricant contained in open cavity 218 of lubricant reservoir 212. The lesser differential shown in FIGS. 7A-7D is also due in part to a smaller air space in which lubricant can be slung as described below.

Upper cavity 706 of modified seal housing 206A depicted in FIGS. 7A and 7C has a smaller air space in which lubricant can be slung as compared to upper cavity 220 of standard seal housing 206 shown in FIG. 1. The smaller air space of cavity 706 prevent excessive lubricant from being slung and, therefore, unavailable for cooling seal 102. As shown in FIGS. 7A and 7C the inner diameter of seal housing 206 is configured to provide a surface parallel to an opposing surface of seal 102 thereby reducing the air space contained by upper cavity 706 as compared to upper cavity 220 shown in FIG. 1.

Lubricant reservoir 212 of modified seal housing 206A provides an additional supply of lubricant as compared to standard seal housing 206. The additional lubricant ensures that there is sufficient lubricant to cool seal 102 even when lubricant is slung onto various surfaces during operation of drive axle 2 (shown in FIG. 1). In one embodiment, the additional lubricant is a predetermined amount approximately equal to an amount of lubricant required to fill a cavity of mechanical drive seal housing above a standing lubricant level (also referred to as a lubricant fill level). For example, in one embodiment, the predetermined amount is approximately equal to the volume of a cavity bounded by the surface of a standing lubricant level, seal 102, and the inner surfaces of modified seal housing 206A (i.e., shelf 504 and adjacent surfaces).

In one embodiment, modified seal housing 206A is cast and machined as necessary to produce the features shown in FIGS. 1-5. Modified seal housing 206A can alternatively be entirely machined from stock. Modified seal housing 206A can be iron, steel, aluminum, or any other material having properties sufficient for requirements of modified seal housing 206A.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A mechanical drive seal housing comprising:
   a circular outer diameter;
   a circular inner diameter;
   a seal receiving slot located on a first side of the mechanical drive seal housing between the outer diameter and the inner diameter;
   a lubricant reservoir located adjacent to the seal receiving slot and between the outer diameter and the inner diameter,
   wherein the lubricant reservoir protrudes adjacent to a surface of a standing lubricant level, and
   wherein the lubricant reservoir protrudes tapered from a first point of zero protrusion to a point of maximum protrusion to a second point of zero protrusion along substantially one-half the circumference of the mechanical drive seal housing.

2. The mechanical drive seal housing of claim 1 wherein the lubricant reservoir protrudes outward from a second side of the mechanical drive seal housing.

3. The mechanical drive seal housing of claim 1 wherein the lubricant reservoir is sized to contain a predetermined amount of lubricant.

4. The mechanical drive seal housing of claim 3 wherein the predetermined amount of lubricant is an additional amount substantially equal to an amount of lubricant required to fill a cavity of the mechanical drive seal housing above a lubricant fill level.

5. The mechanical drive seal housing of claim 1 wherein the lubricant reservoir is located radially and axially inward of the seal receiving slot.

6. The mechanical drive seal housing of claim 1 further comprising:
   a shelf located opposite a radially inward facing surface of the seal receiving slot, the shelf spaced from the radially inward facing surface of the seal receiving slot to produce a cavity having a predetermined volume.

7. The mechanical drive seal housing of claim 1 wherein the lubricant reservoir protrudes outward parallel to a longitudinal axis of the mechanical drive seal housing.

8. The mechanical drive seal housing of claim 1 wherein the lubricant reservoir is tapered so that the point of maximum protrusion is located at a point on the mechanical drive seal housing that will be a lowest point of the mechanical drive seal housing when installed in a drive axle.

9. A drive axle comprising:
   a spindle;
   a wheel hub rotatable connected to the spindle;
   a mechanical drive seal housing connected to the spindle between the spindle and the wheel hub, the mechanical drive seal housing comprising:
   a circular outer diameter;
   a circular inner diameter;
   a seal receiving slot located on a first side of the mechanical drive seal housing between the outer diameter and the inner diameter;
   a lubricant reservoir located adjacent to the seal receiving slot and between the outer diameter and the inner diameter,
   wherein the lubricant reservoir protrudes adjacent to a surface of a standing lubricant level, and
   wherein the lubricant reservoir protrudes tapered from a first point of zero protrusion to a point of maximum protrusion to a second point of zero protrusion along the substantially one-half the circumference of the mechanical drive seal housing.

10. The drive axle of claim 9 wherein the lubricant reservoir protrudes outward from a second side of the mechanical drive seal housing.

11. The drive axle of claim 9 wherein the lubricant reservoir is sized to contain a predetermined amount of lubricant.

12. The drive axle of claim 11 wherein the predetermined amount of lubricant is an additional amount substantially equal to an amount of lubricant required to fill a cavity of the mechanical drive seal housing above a lubricant fill level.

13. The drive axle of claim 9 wherein the lubricant reservoir is located radially and axially inward of the seal receiving slot.

14. The drive axle of claim 9, the mechanical drive seal housing further comprising:
   a shelf located opposite a radially inward facing surface of the seal receiving slot, the shelf spaced from the radially inward facing surface of the seal receiving slot to produce a cavity having a predetermined volume.

15. The drive axle of claim 9 wherein the lubricant reservoir protrudes outward parallel to a longitudinal axis of the mechanical drive seal housing.

16. The drive axle of claim 9 wherein the lubricant reservoir is tapered so that the point of maximum protrusion is located at a point on the mechanical drive seal housing that will be a lowest point of the mechanical drive seal housing when installed in the drive axle.

17. The drive axle of claim 9 further comprising tapered roller bearings which rotatably connect the wheel hub to the spindle.

18. The drive axle of claim 9 further comprising a stationary seal half retained in the seal receiving slot via a first O-ring, and a rotating seal half retained in a slot in the wheel hub via a second O-ring.

19. The drive axle of claim 18 wherein the first O-ring and the second O-ring urge the stationary seal half and the rotating seal half into contact with one another.

20. The drive axle of claim 18 wherein the rotating seal half comprises a texture for lifting lubricant from the lubricant reservoir and the stationary seal half comprises a texture for receiving the lubricant from the rotating seal half.

\* \* \* \* \*